US00RE37423B1

(19) United States
(12) Reissued Patent
Glennon et al.

(10) Patent Number: US RE37,423 E
(45) Date of Reissued Patent: Oct. 30, 2001

(54) SENSING REFRIGERANT TEMPERATURE IN A THERMOSTATIC EXPANSION VALVE

(75) Inventors: Thomas Francis Glennon, Darien; Robert James Torrence, Addison, both of IL (US)

(73) Assignee: Eaton Corporation, Cleveland, OH (US)

(21) Appl. No.: 07/904,420

(22) Filed: Jun. 26, 1992

Related U.S. Patent Documents

Reissue of:
(64) Patent No.: 4,984,735
Issued: Jan. 15, 1991
Appl. No.: 07/495,182
Filed: Mar. 19, 1990

(51) Int. Cl.[7] ..... F25B 41/04
(52) U.S. Cl. ..... 236/92 B; 62/225
(58) Field of Search ..... 62/225; 236/92 B

(56) References Cited

U.S. PATENT DOCUMENTS

| | | | |
|---|---|---|---|
| 3,478,534 | 11/1969 | Matthies | 236/92 B |
| 4,065,939 | 1/1978 | Thornberry et al. | 236/92 B |
| 4,660,387 | 4/1987 | Usami | 62/225 |
| 4,819,443 | 4/1989 | Watanabe et al. | 236/92 B |

*Primary Examiner*—William E. Tapolcai
(74) *Attorney, Agent, or Firm*—R. A. Johnston

(57) ABSTRACT

A mechanical refrigerant thermal expansion valve has a sensing port scaled with a cupped shape closure received therein and sealed about the cup rim. A cover assembly is removeably attached to the valve over the cup with a thermistor extending into the cup which is filled with thermally conductive grease for thermal conductivity between the cup and the thermistor. The cover assembly has an electrical connector provided thereon. The thermistor is preferably mounted on printed circuit board potted in the cover which may include electronic signal logic and power switching circuitry.

8 Claims, 1 Drawing Sheet

SENSING REFRIGERANT TEMPERATURE IN A THERMOSTATIC EXPANSION VALVE

Matter enclosed in heavy brackets [ ] appears in the original patent but forms no part of this reissue specification; matter printed in italics indicates the additions made by reissue.

BACKGROUND OF THE INVENTION

The present invention relates to systems for controlling the flow of refrigerant in a refrigeration or air conditioning system of the type employing the well known mechanical thermal expansion valve. Typically, valves of this type have an auxiliary passage therethrough adapted for attachment to the discharge line of the refrigerant evaporator for receiving flow therefrom and for connection to the compressor suction return line. The auxiliary passage through the valve body provides a convenient location to sense the temperature of the evaporator discharge for purposes of providing an electric control signal which may be employed in a microcomputer for controlling the operation of the compressor clutch and condenser cooling fan.

Where it is desired to provide electrical sensing of the temperature in the auxiliary refrigerant passage in the thermostatic expansion valve, it has been found desirable to employ a thermistor in the passage for direct fluid temperature sensing. However, providing the mounting of the thermistor through the valve block from the exterior thereof and to provide adequate sealing around the thermistor for preventing leakage of the gaseous refrigerant has been troublesome in high volume mass production. Heretofore, it has been the practice to mount the thermistor on a metal flange and secure the flange to the periphery of a port formed in the valve body to access the auxiliary refrigerant passage. This technique for mounting the thermistor as a sub-assembly has been found to troublesome in high volume production of the valves where breakage of the thermistor has been experienced during the sealing operation which typically employ metal staking. Accordingly, it has been desired to provide a way or means of attaching a thermistor to a sensing port in the valve block after the port has been sealed to retain the pressurized gaseous refrigerant.

It has further been desired in providing a refrigerant temperature sensor in a thermal expansion valve passage to incorporate electronic circuitry at the thermistor location in order that the circuitry may be heat sinked to the low temperature valve block and thereby provide cooling for solid state switching devices handling substantial electrical current flow.

SUMMARY OF THE INVENTION

The present invention provides a mechanical thermal expansion valve for controlling refrigerant flow in a refrigeration or air conditioning system. An auxiliary passage is provided in the valve block for permitting refrigerant discharging from the evaporator to flow through the block to the compressor suction return port. A thermistor is disposed through a sensing port in the valve block to sense temperature of the refrigerant flowing and the refrigerant return passage. In one embodiment, a cup shape closure has the closed end thereof received in the sensing port with the periphery thereof sealed about the port. A thermistor is received in the cup from the exterior thereof and secured therein with thermally conductive grease disposed to provide heat transfer between the wall of the cup and the thermistor. The thermistor is preferably mounted on a printed circuit board received in a cup-shaped cover with the closed end extending exteriorly of the body with the open end sealed about the periphery of the sensing port. An electrical connector extends from the printed circuit board through the wall of the cover and exteriorly thereof for electrical connection thereto. The printed circuit board is potted in the cup and may contain power switching devices which are cooled by the refrigerant contacting the potting compound surrounding the printed circuit board.

DETAILED DESCRIPTION

Figure 1:
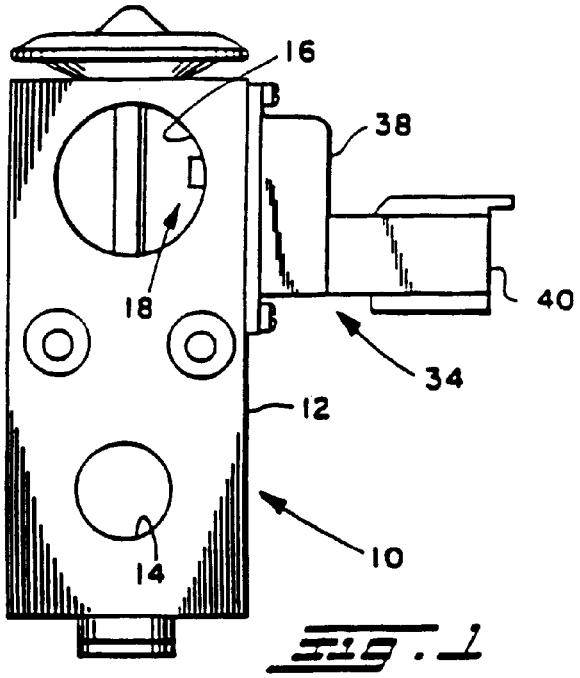
FIG. 1 is a side elevation view of a thermal expansion valve assembly employing the present invention.
Figure 2:
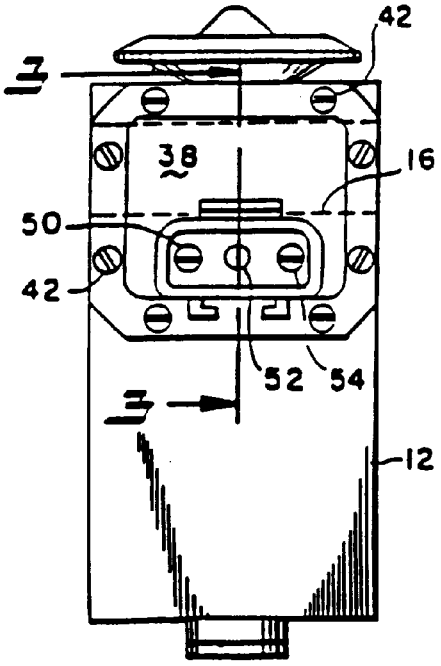
FIG. 2 is a right hand side view of the valve assembly of FIG. 1.

Referring to FIG. 1, the valve assembly of the present invention is indicated generally at 10 as having a valve body 12 having a valved outlet port 14 and an auxiliary through passage 16 spaced therefrom which extends continuously through the valve block 12. The passage 16 has a temperature sensor assembly indicated generally at 18 extending through the valve block into the passage 16.

The temperature sensor assembly 18 is received through a port hole 20 formed in the valve block 12 for communicating the exterior thereof with the passage 16. The exterior end of port 20 is counter bored to enlarged diameter 22; and, the intersection of the diameter 20 with the bottom 24 of the counterbore is chamfered at 26 to provide a seat for sealing ring 28.

A generally deep drawn cup-shaped closure 30 is provided and has a radially outwardly extending flange 32 provided thereon. The closed end of closure 30 is received in port 20 and the flange 32 is secured over O-ring 28 and retained in the bottom 24 of the counterbore by suitable retaining means, as for example, deformation of material of the body over the flange 32. In the presently preferred practice, the flange 32 is ring staked in place over the O-ring. However, it will be understood that other fastening expedients may be employed.

A housing or cover, indicated generally at 34, has a peripheral flange 36 formed thereabout and has a generally cup shaped central section 38 with an electrical receptacle portion 40 extending outwardly from the closed end of the cup shaped central portion 38. The flange 36 is retained on the surface of the valve block 12 with the cup shaped central portion disposed over the counterbore 22; and, the flange 36 is retained on the valve block by suitable fastening expedients as, for example, screws 42.

The cup shaped central portion 38 of cover 34 has a shoulder or ledge 44 formed peripherally about the inner side wall thereof and has received thereon a printed circuit board 46 which has a tubular or hollow support stanchion or post 48 extending therefrom. The printed circuit board also has a plurality of electrical connector pins 50, 52, 54 attached thereto and extending outwardly from the opposite side of the circuit board 46 from post 48. The pins extend outwardly through apertures, such as aperture 56 shown in FIG. 3 for pin 52, and into a protective the shroud 40 adapted for receiving and guiding therein a mating electrical connector (not shown).

Figure 3:
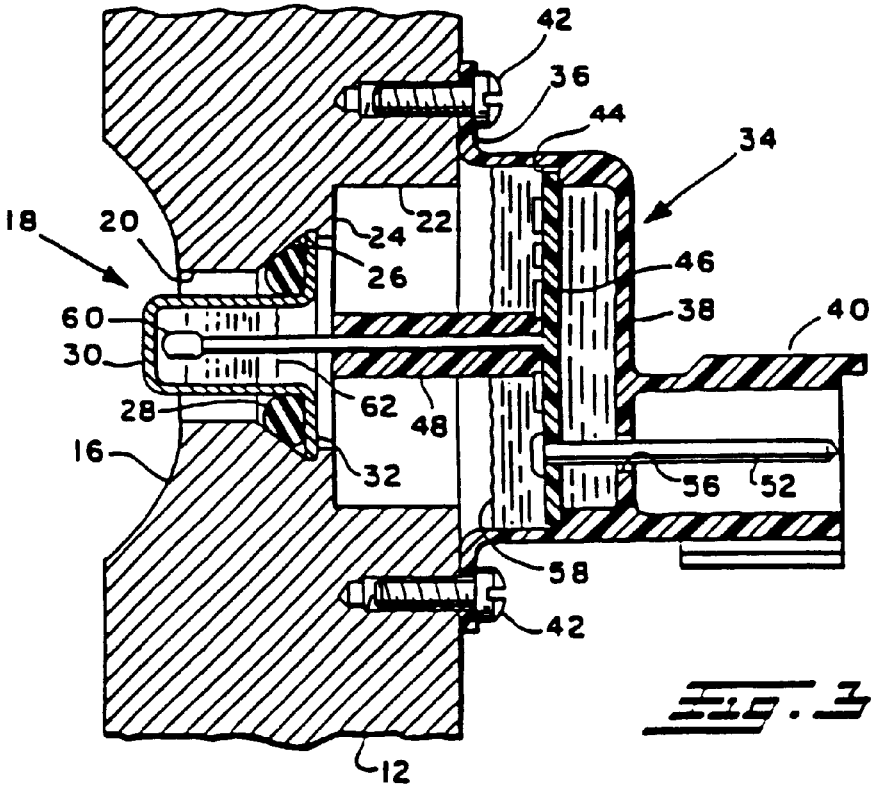
FIG. 3 is a partial section view taken along section indicating lines 3—3 of FIG. 2.

The printed circuit board 46 and its attachments are potted into the central portion 38 of the cover by a suitable potting compound indicated by reference numeral 58 in FIG. 3.

A sensing thermistor indicated by reference numeral 60 in FIG. 3 is received through the post 48 and is attached to the circuitry of circuit board 46 with the end thereof extending out of the post and into the interior of the cup 30.

The end of the thermistor 60 in cup 30 is surrounded by suitable thermally conductive grease 62 or other suitable fluidized thermally conductive medium which may be suitably compacted and retained about the thermistor for conducting heat between the thermistor and the wall of the cup 30. In the presently preferred practice the grease has a thermal resistance of 0.06° C. per Watt and is obtainable from Wakefield Engineering, Inc., Wakefield, Mass., 01880 under the manufacturer's designation 120-8.

The structural arrangement of the cover of the assembly 34 of the present invention thus permits the port 20 in the valve block to be sealed by cup 30 as a completed subassembly. The thermistor is then mounted on the cover assembly 34 and assembled onto the valve block of the exterior thereof in a removable manner without interrupting the seal of the port 20 in the valve block. This unique arrangement enables changing or replacement of the thermistor 60 without requiring discharging of the sealed refrigerant in the refrigeration system.

The present invention also permits a mechanical thermal expansion valve to be conveniently outfitted with electrical temperature sensing for providing signals to a microprocessor for electrical control of the refrigeration system component such as the compressor clutch and the condenser fan.

The preferred means of mounting the thermistor on a printed circuit board permits the compact mounting of solid state switching devices, for example, FET switches, on the printed circuit board along with suitable switching logic to eliminate the need of long leads for the low power thermistor signal to the power switching circuitry.

Although the invention has herein above been described with respect to the illustrated embodiments, it will be understood that the invention is capable of modification and variation and is limited only by the following claims.

What we claim is:

1. A valve assembly for controlling flow of refrigerant to a heat exchanger comprising:

(a) body means defining an inlet adapted for receiving pressurized refrigerant, said body means including means for restricting flow and an outlet for discharging flow at a significantly reduced pressure, said outlet adapted for connection to said heat exchanger;

(b) means defining a continuous passage through said body means, said passage adapted for connection to receive therethrough refrigerant flow discharging from a heat exchanger;

(c) said body means defining a port communicating exteriorly with said continuation passage;

(d) means defining a cup shaped closure for said port, said closure sealingly attached thereover with the open end of said cup shape exteriorly thereof;

(e) thermistor means received in said cup shape and including electrical attachment means accessible exteriorly of said closure and adapted for electrical attachment thereto; and, (f) a thermally conductive fluidized medium disposed in said cup shape about said thermistor for providing heat-transfer between said cup-shaped closure and said thermistor.

2. The assembly defined in claim 1 wherein said closure has a generally cup shaped configuration with the open end thereof disposed to the exterior of said body means with said thermistor received in said cup shape; and, said thermally conductive medium has thermal resistance of about 0.06° C. per Watt.

3. The assembly defined in claim 1 wherein said closure has a generally cup shaped configuration with the open end thereof facing interiorly of said port; cover means received over said cup with said thermistor extending therefrom; and, said attachment means extends from said thermistor means exteriorly through the wall of said cover means.

4. The assembly defined in claim 1 wherein said closure employs a resilient seal ring thereabout and is secured to said body means by deformation of material.

5. The assembly defined in claim 1 wherein said closure is secured to said body means by deforming the material of said body means over the periphery of said closure means.

6. The assembly defined in claim 1 wherein said closure is secured to said body means by ring staking.

*7. A valve assembly for controlling flow of refrigerant to a heat exchanger comprising:*

*(a) body means defining an inlet passage adapted for receiving pressurized refrigerant, said body means including means for restricting flow and an outlet for discharging flow at a significantly reduced pressure, said outlet passages adapted for connection to said heat exchanger;*

*(b) means defining a continuous passage through said body means, said passage adapted for connection to receive therethrough refrigerant flow discharging from a heat exchanger;*

*(c) said body means defining a sensing port communicating with one of said passages;*

*(d) means defining a cup-shaped closure for said sensing port, said closure sealingly attached thereover with the open end of said cup shape exteriorly thereof;*

*(e) thermistor means received in said cup shape and including electrical attachment means accessible exteriorly of said closure and adapted for electrical attachment thereto; and,*

*(f) a thermally conductive fluidized medium disposed in said cup shape about said thermistor for providing heat transfer between said cup shaped closure and said excitement.*

*8. The assembly defined in claim 7, wherein said thermally conductive medium has a thermal resistance of about 0.06° C. per Watt.*

* * * * *